J. H. Gisler,
Bee Hive.

No. 112,139.  Patented Feb. 28, 1871.

Witnesses:
J. W. Herthel
Robert Burns

Inventor:
Joseph H. Gisler
by his Att'ys
Herthel & Co.

N. PETERS, PHOTO-LITHOGRAPHER, WASHINGTON, D. C.

United States Patent Office.

JOSEPH H. GISLER, OF ST. LOUIS, MISSOURI.

Letters Patent No. 112,139, dated February 28, 1871.

---

IMPROVEMENT IN BEE-HIVES.

---

The Schedule referred to in these Letters Patent and making part of the same.

---

*To all whom it may concern:*

Be it known that I, JOSEPH H. GISLER, of St. Louis, in the county of St. Louis and State of Missouri, have made certain new and useful Improvements in Bee-Hives; and I do hereby declare that the following is a full and true description thereof, reference being had to the accompanying drawing and to the letters of reference marked thereon.

This invention consists in the arrangement and combination of parts, as follows:

First, in constructing the hive proper to consist of upper and lower tiers of sections of sashes or frames, in such a manner that the bees have free access to all parts of the hive.

Secondly, in hinging said sashes upon a frame independent of the exterior casing, so that the operator is readily enabled to withdraw the entire hive to gather the honey, as well as to remove each sash or comb without disturbing those remaining.

Thirdly, said improvement relates in constructing a metallic moth-chamber and trap in the bottom of the outer housing, and to certain detail construction of parts, hereinafter to be more fully described.

To enable those skilled in the art to make and use my improved hive, I will now more fully describe the same, referring herein to the accompanying—

Figure 1:
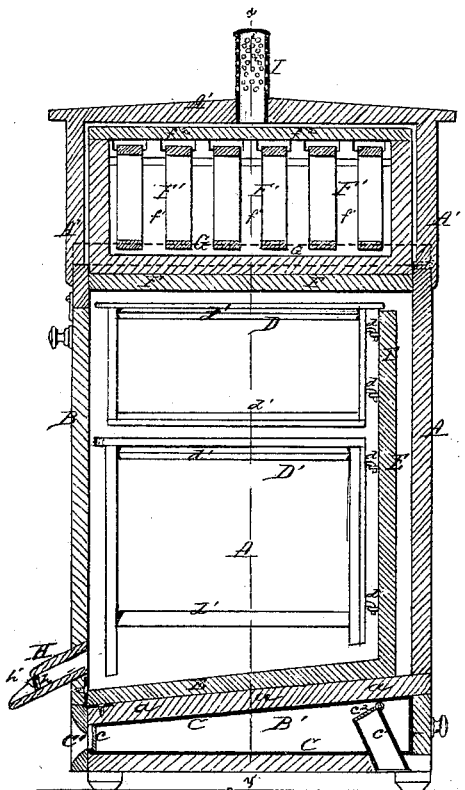

Figure 1 as a longitudinal sectional elevation; to

Figure 2:
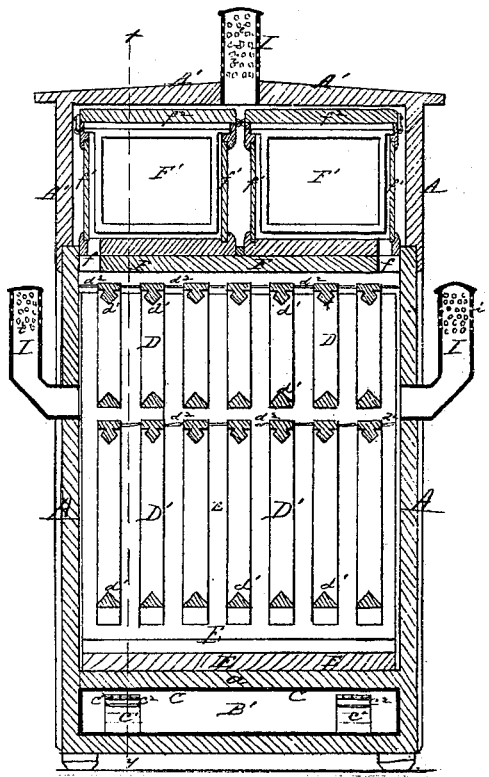
Figure 3:
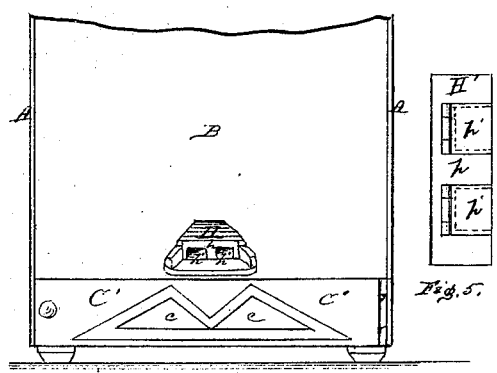
Figure 4:
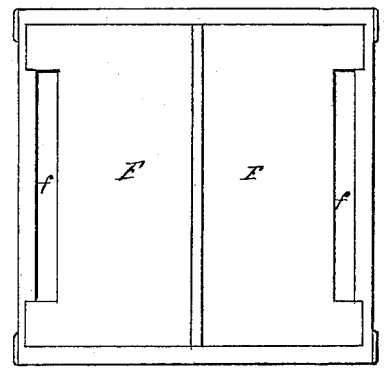

Figure 2 as a transverse sectional elevation;

Figure 3 as a part front elevation,

Figure 4 as top plan of cap-board; and to

Figure 5 as detail figure of the trough entrance.

The hive proper is stored within an outer housing, A.

Within said housing I provide an inclined false bottom, $a$, to which I hinge the door B.

A chamber, B', is thus formed in the bottom of the housing, in which moths and other insects are entrapped in manner as follows:

I construct, to fit within said bottom chamber B', a metallic case, C, closed on all sides, but having a glass front, $c$, to allow for the entrance of sunlight. For this purpose, also, the moth-chamber door C', hinged to the side of the housing A, is suitably mortised, as shown in fig. 3.

In the rear bottom end of said metallic moth-case C I have arranged one or more inclined entrances, $c^1$, projecting somewhat below the bottom of the housing, and through which the moths or insects find entrance to the chamber B'.

Said entrances are each provided with a hinged trap-door, $c^2$, as shown in figs. 1 and 2; as the moths enter the trap-doors $c^2$ close behind, preventing their escape.

By thus constructing the moth-chamber of metal the insects are prevented from entering the hive as well as of breeding within the same.

The hive proper consists of two rows or tiers of sashes, D and D', hinged, by means of hooks and staples, $d$, upon an independent frame, E.

Each of said sashes or frames is constructed rectangular in form, having its upper and lower parts suitably chamfered to form projecting edges, $d^1$, to which the bees attach their combs.

Said sashes are kept equally distant from each other by suitable stays, $d^2$.

By thus forming upper and lower tiers of sashes, D D', the bees are better enabled to pass through the center of the sashes without disturbing cluster of bees, and also to reach the upper hive for the better storing away of surplus honey; also, by hinging each sash, as shown, the operator is readily enabled to withdraw any comb and replace a new one, as desired.

Detachably secured near the top of the housing A I arrange the cap-board F in such proximity to the upper hive D as to leave sufficient space for the passage of the bees.

Said cap-board F has the side openings $f$, as clearly shown in fig. 4.

The honey-caps or chambers, F', I arrange with suitable sashes of ordinary construction; and in order to permit the operator to see the amount of honey stored therein, I provide said honey-caps with glass windows, $f^1$.

Also, for the better withdrawing of the honey stored in said honey-chamber F', I have provided the same with suitable hinged doors, $f^2$, as clearly shown in figs. 1 and 2.

In case said honey-caps are desired to be used, the same are placed on top of the cap-board F and shielded by proper extension housing, A', fitted detachably on top of the main housing A.

When no honey-caps are used, the housing A is firmly closed on top by a proper hinged door, G, as shown in dotted lines in fig. 1.

The entrance to the hive for the bees is through the trough H, partly closed on top, and secured to the door B of the housing proper.

To regulate the entrance of the bees to the hives, I insert in said trough H the partition-plate $h$, having one or more openings, $h'$.

To prevent the return of drones, I use a second partition-plate, H', having hinged doors, as shown in detail, fig. 5.

To ventilate the hives, I provide the housing A with ventilating-tubes, I.

Said ventilators are of metal, and formed to curve or turn upward, as shown in figs. 1 and 2, and having proper orifices, $i$.

Said tubes I, thus constructed, prevent the bees from clogging the tubes, and a free ventilation of the hives is secured.

Having thus fully described my said invention, What I claim is—

A bee-hive, consisting of the housing A A', sashes D D', hinged to a frame, E, door B, cap-board F, side openings f, honey-chambers F', metallic moth-trap C, ventilating-tubes I, trough H, partition-plates h H', all constructed, arranged, and combined to operate substantially as and for the purpose described.

In testimony of said invention I have hereunto set my hand in presence of witnesses.

JOSEPH H. GISLER.

Witnesses:
WILLIAM W. HERTHEL,
ROBERT BURNS.